United States Patent
Akimoto

(10) Patent No.: US 8,597,702 B1
(45) Date of Patent: Dec. 3, 2013

(54) METHOD TO IMPROVE SHELF LIFE OF BAKED EDIBLE PRODUCTS

(71) Applicant: Yoshihiko Akimoto, Nasushiobara (JP)

(72) Inventor: Yoshihiko Akimoto, Nasushiobara (JP)

(*) Notice: Subject to any disclaimer, the term of this patent is extended or adjusted under 35 U.S.C. 154(b) by 0 days.

(21) Appl. No.: 13/713,074

(22) Filed: Dec. 13, 2012

(51) Int. Cl.
A23L 3/3571 (2006.01)

(52) U.S. Cl.
USPC .............. 426/8; 426/394; 426/398; 426/407; 426/411; 426/325; 426/326; 426/62; 426/128; 426/115; 426/124; 426/113

(58) Field of Classification Search
USPC ............. 426/403, 8, 394, 398, 407, 411, 325, 426/326, 62, 128, 115, 120, 124, 113
See application file for complete search history.

(56) References Cited

U.S. PATENT DOCUMENTS

| | | | | |
|---|---|---|---|---|
| 1,146,709 | A * | 7/1915 | Hugh | 426/124 |
| 1,411,223 | A * | 3/1922 | Retzbach | 426/124 |
| 1,437,512 | A * | 12/1922 | Gereke | 229/122.32 |
| 1,942,212 | A * | 1/1934 | Heseltine | 426/113 |
| 2,110,615 | A * | 3/1938 | Wilcox | 206/525 |
| 2,505,999 | A * | 5/1950 | Smith | 123/262 |
| 2,664,358 | A * | 12/1953 | Eichler | 426/124 |
| 2,858,220 | A * | 10/1958 | Battiste | 426/8 |
| 2,911,307 | A * | 11/1959 | Handler | 53/449 |
| 3,015,538 | A * | 1/1962 | Weber et al. | 264/611 |
| 3,443,971 | A * | 5/1969 | Wood | 426/124 |
| 3,645,758 | A * | 2/1972 | MacManus | 426/90 |
| 4,120,984 | A * | 10/1978 | Richardson et al. | 426/412 |
| 4,415,598 | A * | 11/1983 | Chen et al. | 426/394 |
| 4,426,401 | A * | 1/1984 | Ottow et al. | 426/394 |
| 4,525,367 | A * | 6/1985 | Allison | 426/394 |
| 4,590,078 | A * | 5/1986 | Umina | 426/113 |
| 4,590,349 | A | 5/1986 | Brown et al. | |
| 4,610,885 | A * | 9/1986 | Tait | 426/130 |
| 4,741,907 | A | 5/1988 | Furuhashi | |
| 4,777,057 | A * | 10/1988 | Sugisawa et al. | 426/412 |
| 4,813,791 | A * | 3/1989 | Cullen et al. | 383/40 |
| 5,045,333 | A | 9/1991 | Petrofsky et al. | |
| 6,013,294 | A | 1/2000 | Bunke et al. | |
| 6,060,088 | A * | 5/2000 | Akimoto | 426/8 |
| 6,733,808 | B2 | 5/2004 | Gosselin et al. | |
| 6,803,067 | B2 | 10/2004 | Braginsky et al. | |
| 7,815,952 | B2 | 10/2010 | Inoue et al. | |
| 2008/0069485 | A1 | 3/2008 | France et al. | |
| 2012/0156326 | A1 | 6/2012 | Eijk et al. | |

FOREIGN PATENT DOCUMENTS

| | | | |
|---|---|---|---|
| EP | 0 368 601 | * | 7/1989 |
| GB | 1 271 892 | * | 4/1972 |

* cited by examiner

Primary Examiner — Rena Dye
Assistant Examiner — Chaim Smith
(74) Attorney, Agent, or Firm — Patent Law & Venture Group; Gene Scott

(57) ABSTRACT

A method to improve shelf life of a baked edible product includes baking dough in a sealable container that is provide with a lining of flexible material, thereby converting the dough into a baked edible product. Thereafter, a top surface of the baked edible product is covered using the flexible material and placed against a surface at baking temperature. The container may be inverted. Thereafter, the container and baked edible product is cooled in a dry and sterile atmosphere.

6 Claims, 4 Drawing Sheets

METHOD TO IMPROVE SHELF LIFE OF BAKED EDIBLE PRODUCTS

BACKGROUND

The disclosed subject matter relates to the field of preparing baked edible products, and more particularly but not exclusively to improving shelf life and quality of baked edible products.

Baked edible products are widely used throughout the world. While conventional baking business involves selling freshly baked edible products over the counter, a substantially large market exists for canned baked edible products.

In the canned baked edible product industry, one strives to improve the shelf life of the products, while trying to retain desired characteristics in the baked edible products. One of the known methods of preparing canned baked edible products involves baking the product within the can in which the product will be stored and sold. In such a method, dough is baked into a baked edible product in a container that is lined using a flexible sheet material. The baked edible product has an exposed upper surface, which is accessible to the upper lip of the container. The exposed upper surface of the baked edible product, is susceptible to contamination. After baking, the product is taken out of the oven and an upper portion of the sheet material is wrapped over the upper surface of the baked product. Subsequently, the product is cooled. In the prior art method, it has been observed that, contaminants, which may be floating in the air within the facility in which the product is being baked, may settle on the upper surface of the product, after the baked edible product is taken out of the oven and prior to sealing the container. Such contamination adversely affects the shelf life and quality of the baked edible product.

In light of the foregoing discussion, there is a need to improve shelf life of canned baked edible products.

SUMMARY

An embodiment provides a method to improve shelf life of a baked edible product. The method includes, baking dough in a container that is provide with a lining using a flexible material, thereby converting the dough into a baked edible product. Thereafter, a top surface of the baked edible product is covered using the flexible material. Subsequently, the covered baked edible product is baked, thereby neutralizing contaminants, if any, settled on the baked edible product.

Another embodiment provides a method to improve shelf life of a baked edible product. The method includes baking dough in a container that is provide with a lining using a flexible material, thereby converting the dough into a baked edible product. Thereafter, a top surface of the baked edible product is covered using the flexible material. Subsequently, the container is inverted and placed on a heated surface of an oven, such that the top surface faces the heated surface. Thereafter, the covered baked edible product is baked, thereby neutralizing contaminants, if any, settled on the baked edible product.

Yet another embodiment provides a further method to improve the shelf life of a baked edible product. The method includes baking dough in a container that is provided with a lining using a flexible material, thereby converting the dough into a baked edible product, wherein baking is carried out at a temperature of approximately 165 degrees C. for between 25 and 40 minutes, depending on sizes of container. Thereafter, a top surface of the baked edible product is covered using the flexible material. Subsequently, the container is inverted and placed on a heated surface of an oven, such that the top surface faces the heated surface. Thereafter, the covered baked edible product is baked, thereby neutralizing contaminants, if any, settled on the baked edible product, wherein baking is carried out at a temperature of approximately 165 degrees C. for approximately 2 minutes.

BRIEF DESCRIPTION OF THE DRAWINGS

Embodiments are illustrated by way of example in the Figures of the accompanying drawings, in which like references indicate similar elements and in which.

Same reference numbers refer to the same item in each drawing view.

DETAILED DESCRIPTION

The following detailed description includes references to the accompanying drawings, which form a part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments. The embodiments can be combined, other embodiments can be utilized, or structural, logical, and can be made without departing from the scope of what is claimed. The following detailed description is, therefore, not to be taken as a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
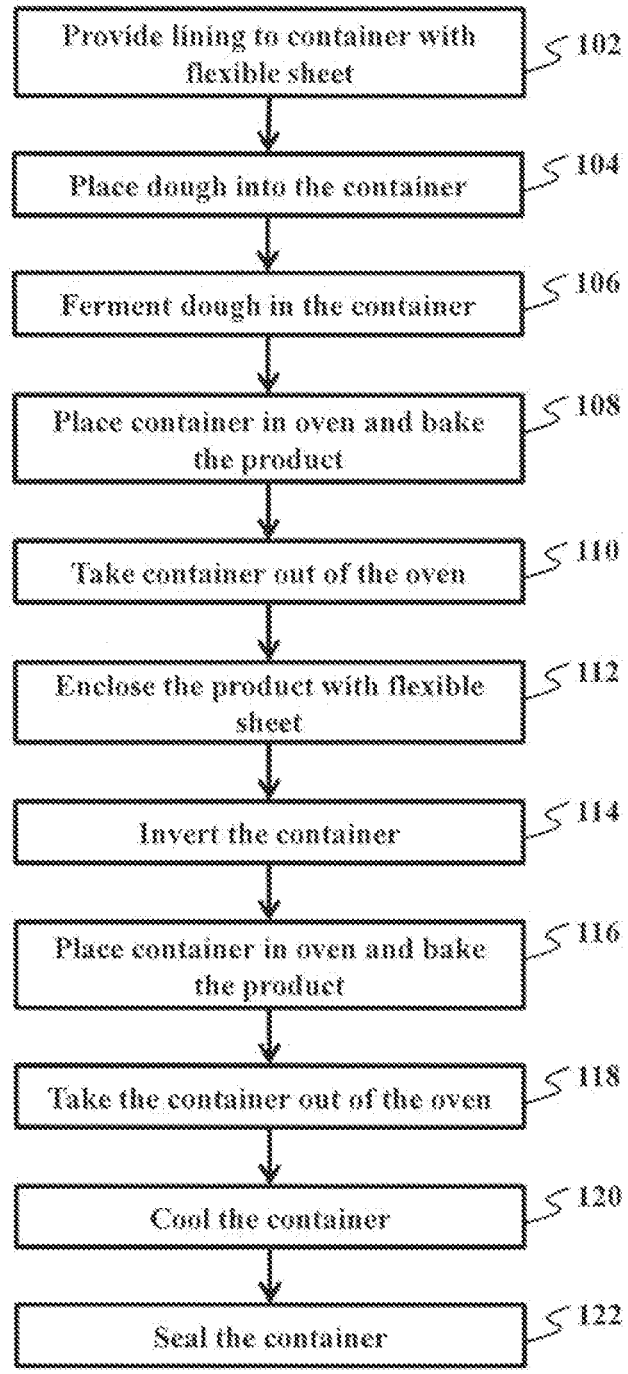
FIG. 1, is an example of a flow chart illustrating a method for preparing a baked edible product, in accordance with an embodiment.

Referring now to FIG. 1, wherein FIG. 1 is a flow chart illustrating a method for preparing a baked edible product, in accordance with an embodiment. At step 102, a container which will be used for baking is lined using a flexible sheet. Subsequently, dough that will be eventually baked into the baked edible product is paced in the container, at step 104. Thereafter, at step 106, the dough that is placed in the container is allowed to ferment {do we need to add yeast?}. As a result of fermenting, the dough rises to form a top surface of the baked edible product. Once the dough is sufficiently fermented, the container, which includes the flexible sheet and the fermented dough, is placed over a heated surface of an oven and baked. After the dough is sufficiently baked, at step 110, the container is taken out of the oven. Subsequently, at step 112, the top surface of the baked edible product is enclosed using the flexible sheet that is used for lining the container. Thereafter, at step 114, the container is inverted. The inverted container is again placed in the oven, such that the top surface of the baked edible product faces the heated surface of the oven and the same is baked, at step 116. After the product is sufficiently baked again, the container is taken out of the oven at step 118. Subsequently, the container is cooled at step 120. Thereafter, at step 122, the container is sealed.

Figure 2:
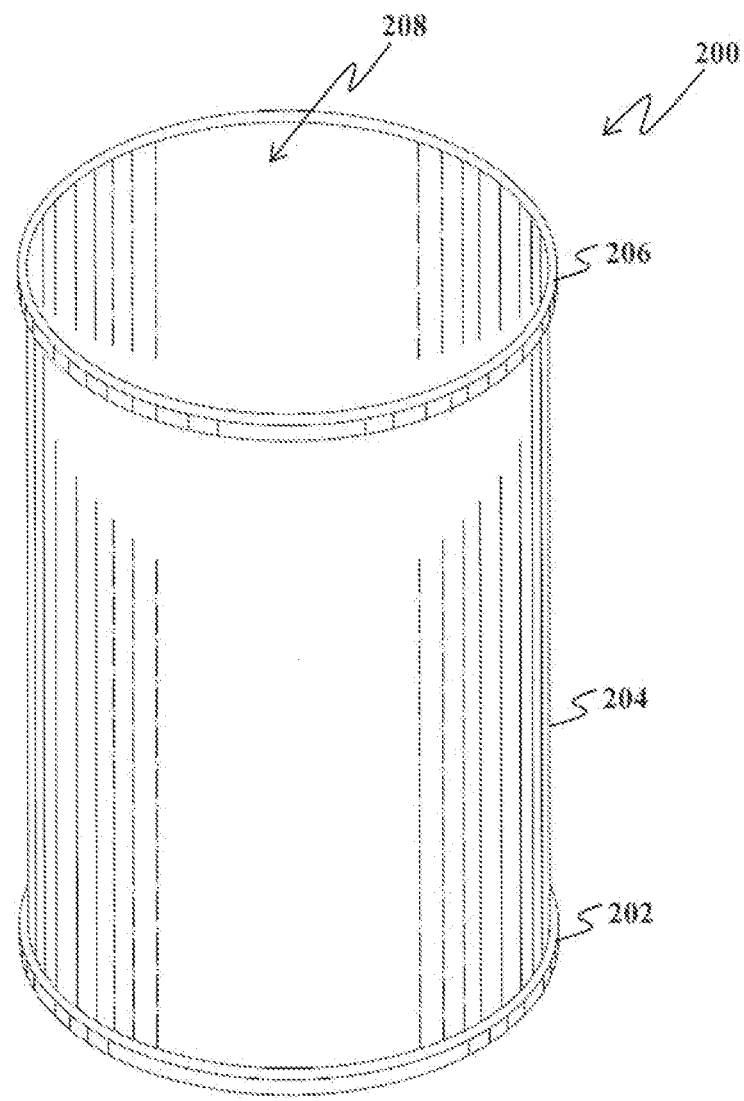
FIG. 2 is an example perspective view of a container 200 used for preparing a baked edible product, in accordance with an embodiment.

FIG. 2 illustrates a container 200 used for preparing a baked edible product, in accordance with an embodiment {unfortunately FIG. 2 shows as a black rectangle and is not visible}. The container 200 has a bottom wall 202 integral with a side wall 204 terminating at an upper lip 206. Upper lip 206 provides access to an interior 208 of the container 200. The container 200 can have a circular cross section, as illustrated in the figure.

In an embodiment, a container having a certain shape can be chosen based on the desired shape of the baked edible product.

Figure 3:
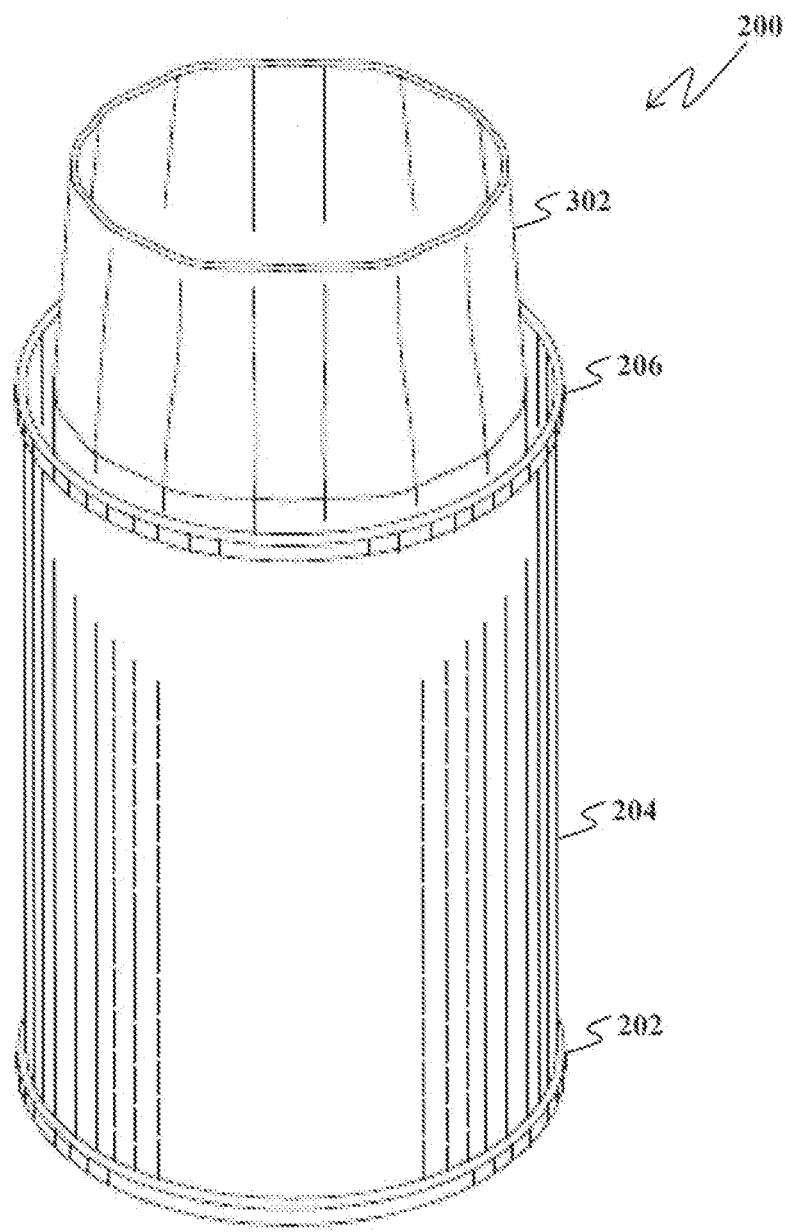
FIG. 3 is an example perspective view of the container 200 provided with lining 302, in accordance with an embodiment.

To prepare the baked edible product, a lining is provided to the interior 208 of the container 200. FIG. 3 illustrates the container 200 provided with the lining, in accordance with an embodiment. The lining is provided to the container 200 using a flexible sheet 302. The flexible sheet 302 covers the inside bottom wall 202 and the inside side wall 204 of the container 200.

In an embodiment, the flexible sheet 302 covers at least a part of the bottom wall 202 and the side wall 204 of the container 200.

In an embodiment, the flexible sheet 302 is of a material which has the capability to absorb moisture. In an embodiment, the flexible sheet 302 is made of glassine paper.

In an embodiment, the flexible sheet 302 is of a material having strength sufficient for pulling the baked edible product from the container 200 and a moisture absorption and wicking capacity for distributing absorbed moisture uniformly around the baked edible product.

Figure 4:
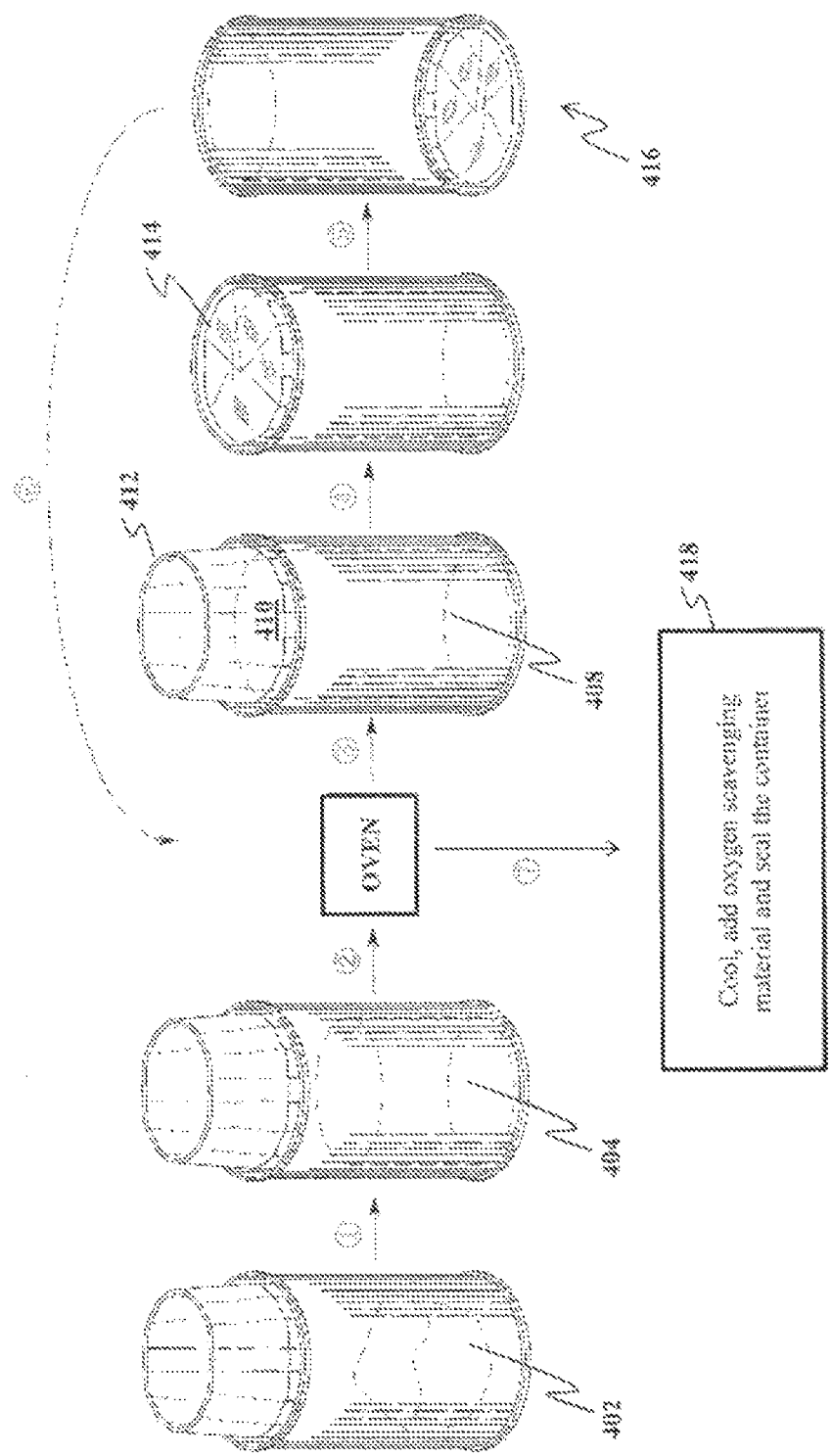
FIG. 4 is an example chart showing steps involved in preparing a baked edible product, in accordance with an embodiment and showing the steps of a method labeled in sequence from 1-7.

After lining the container 200, dough is placed in the container 200, which will eventually be baked. FIG. 4 illustrates steps involved in preparing a baked edible product, in accordance with an embodiment. Dough 402, which will be baked, is placed in the container that is provided with lining using flexible sheet 302. The container 200 which now includes the dough 402 is allowed to ferment, which results in the formation of fermented dough 404 {need to mention the use of a fermenting agent such as yeast}. The container 200 is thereafter placed on a heated surface of an oven. In an embodiment, baking is carried out at a temperature of approximately 165 degrees C. for between 25 and 40 minutes, more preferably for 35 minutes. The baking time depends on the size of the can or container 200 in which the dough 404 is placed. Thereafter, the container is taken out of the oven. Baking of the container results in formation of baked edible product 408. The baked edible product 408 has a top surface 410, which is exposed to the non-heated atmosphere when the container 200 is taken out of the oven. Due to such exposure, contaminants that may be floating in the facility in which the product is being baked, may settle on the top surface 410 of the baked edible product 408. Such settling of contaminants adversely affects the shelf life of the baked edible product 408. To improve the shelf life of the baked edible product 408, it has to be sterilized. Sterilization of the baked edible product 408 is carried out by enclosing the top surface 410 using an upper portion 412 of the flexible sheet 302, thereby enclosing the baked edible product 408. The container 200 that includes the enclosed baked edible product 414 is inverted. The inverted container 416 is placed in the oven, such that the top surface 410 faces and is sealed by a heated surface of the oven, and baking is continued.

In an embodiment, the inverted container 200 along with its constituents is baked at a temperature and duration of time that is sufficient to neutralize the contaminants.

In an embodiment, the inverted container 200 along with its constituents is baked at a temperature of approximately 165 degrees C. for approximately between 1 and 3 minutes. Baking longer than 3 minutes results in an over-baking and shorter than 1 minutes does not assure killing of all microorganisms.

After, baking the container and its constituents for the second time, the container is taken out of the oven and allowed to cool.

In an embodiment, the container and the baked edible product is allowed to cool in an atmosphere that is free of contaminants. Thereafter, the container 200 is sealed against microorganism incursion such as by a canning process. It shall be noted that, several other steps, which are known to a person skilled in the art may be carried out before and after sealing the container but these steps are conducted in an atmosphere free of contaminants.

It has been observed that such a method of sterilization has been found to improve the shelf life of the baked edible product, since, the baked edible product is not exposed to contaminants after the second bake and the sealing of the container.

In an embodiment, the baked edible product is bread.

In an embodiment, the baked edible product can be bread, cake, cookies and such.

The processes described above is described as a sequence of steps, this is solely for the sake of illustration. Accordingly, it is contemplated that some steps may be added, some steps may be omitted, the order of the steps may be re-arranged, or some steps may be performed simultaneously. It is noted that the described method is transformative of the subject of the process wherein a dough is transformed into a sterile baked product.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus the scope of the invention should be determined by the appended claims and their legal equivalents rather than by the examples given.

What is claimed is:

1. A method for improving the shelf life of a baked edible product, the method having sequential steps consisting of:
   lining a container having an open top defining an upper lip with a flexible sheet material;
   packing the container with a dough positioned inside the flexible sheet material;
   fermenting and rising the dough into adjacency with the upper lip;
   baking the container with the dough in an oven heated to between 162° and 168° C. for between 25 and 40 minutes thereby changing the dough into an edible product;
   removing the container with the edible product from the oven and folding the sheet material over the edible product adjacent to the upper lip;
   inverting the container and placing the open top of the container into contact with a surface within the oven thereby sealing the upper lip to the surface;
   baking the container and the edible product at not greater than 165° C. for between 1 and 3 minutes;
   removing the container and the edible product from the oven for cooling while maintaining sealed contact between the upper lip of the container and the surface; and
   removing the container and contents from the surface within a clean booth and sealing the container within the clean booth.

2. The method according to claim 1, wherein baking the dough in the container comprises baking the dough during the first baking, at a temperature of 165° C. for 35 minutes.

3. The method according to claim 1, further comprising, inverting the container.

4. The method according to claim 1, further comprising baking the baked edible product until contaminants are neutralized.

5. The method according to claim 1, wherein baking the baked edible product comprises baking the baked edible product during the second baking at a temperature of 165° C. for 2 minutes.

6. The method according to claim 1, further comprising cooling the baked edible product, in an atmosphere that is free of contaminants and moisture.

* * * * *